United States Patent [19]

Burns

[11] Patent Number: 4,632,611

[45] Date of Patent: Dec. 30, 1986

[54] PAPER DRILL

[75] Inventor: Robert J. Burns, Waterloo, Canada

[73] Assignee: Dexter-Lawson Products Limited, Cambridge, Canada

[21] Appl. No.: 604,665

[22] Filed: Apr. 27, 1984

[51] Int. Cl.[4] .............................................. B23B 51/04

[52] U.S. Cl. .................................... 408/205; 408/204; 408/232; 279/48

[58] Field of Search ............... 408/204, 205, 231, 232; 279/43, 47, 48

[56] References Cited

U.S. PATENT DOCUMENTS

| | | | |
|---|---|---|---|
| 1,233,613 | 7/1917 | Schreurs | 408/204 X |
| 1,348,190 | 8/1920 | Wahl | 408/205 |
| 1,557,464 | 10/1925 | Mick | 408/205 |
| 2,606,615 | 8/1952 | Pevey et al. | 408/205 |
| 2,978,250 | 4/1961 | Abadjieff | 279/48 |

*Primary Examiner*—Donald R. Schran
*Attorney, Agent, or Firm*—Rogers, Bereskin & Parr

[57] ABSTRACT

A drill for a paper drilling machine. The drill is made of two separate parts, namely a cutting bit of hollow generally cylindrical form having an annular cutting edge at one end, and a hollow cylindrical sleeve which receives the opposite end portion of the bit and which is itself received in a collet assembly of a drill spindle of the machine. The sleeve is radially compressible and is compressed by the collet assembly to frictionally grip the bit and permit transmission of drilling torque from the drill spindle to the bit in use.

9 Claims, 5 Drawing Figures

PAPER DRILL

This invention relates generally to paper drilling machines for forming a series of holes in a stack of paper or the like in a single operation. Other applications of machines of this type are for forming holes in plastics, film, chip board, rubber, cloth or the like.

A paper drilling machine typically comprises a series of generally vertical drill heads positioned above a work table. Each head includes a spindle which carries a hollow cylindrical drill having an annular cutting edge at its lower end. A drive arrangement is provided for simultaneously rotating all of the drills while advancing them towards the the work table.

In the art, a paper drilling machine is typically referred to as a "paper drill" (even though the machine is capable of drilling other materials), but the term "drill" is also used to refer to the cutting tool used in the machine. In the interest of clarity, the machine as a whole will be referred to herein as a "paper drilling machine" and the term "drill" will be used to refer to the actual cutting tool. The present invention in concerned primarily with the drill itself.

A typical conventional drill is made from high grade tool steel and comprises a thin-walled hollow cylindrical stem having an annular cutting edge at one end, and an enlarged cylindrical shank at the opposite end for clamping in the drill head of the machine. The shank is also hollow so that a passageway extends right through the drill for permitting chips of paper or the like removed by the cutting edge in use to pass upwardly through the drill to the cutting head for disposal. It will be understood that the drill must be made to high standards of durability and precision. The drill should be capable of substantially continuous use for extended periods of time and should consistently produce clean-cut holes while allowing for efficient and jam-free removal of chips. Accordingly, conventional drills are quite expensive and represent a significant cost factor in the operation of a paper drilling machine. Most drills are designed to be resharpened but this in itself is a high cost precision operation. If the cutting edge of the drill becomes chipped in use, resharpening may not be a viable option and the entire drill may have to be discarded.

An object of the present invention is to provide an improved drill for a paper drilling machine.

The drill provided by the invention comprises a cutting bit of hollow generally cylindrical form having an annular cutting edge at a first end thereof, and a hollow cylindrical sleeve which is separate from the bit and which has an internal cylindrical cavity shaped to closely receive a second end portion of the bit opposite the cutting edge. The sleeve has an external generally cylindrical surface shaped to fit within a drill spindle of a paper drilling machine and the sleeve is radially compressible by the spindle to frictionally grip the bit and permit the transmission of drilling torque to the bit in use.

In summary, the invention provides a two-part drill designed so that the parts are frictionally held together in use for drilling. The two parts of the drill can be designed for relative ease of manufacture at low cost. It is anticipated that the cost of the bit itself will be such that the bit can be regarded as a disposable item which will be discarded as soon as the cutting edge becomes dull or is damaged. This will avoid the costs associated with resharpening. The sleeve may also be disposable, depending on the material from which it is made.

In order that the invention may be more clearly understood, reference will now be made to the accompanying drawings which illustrate a preferred embodiment of the invention by way of example, and in which.

Figures 1, 2, 3, 4, 5:
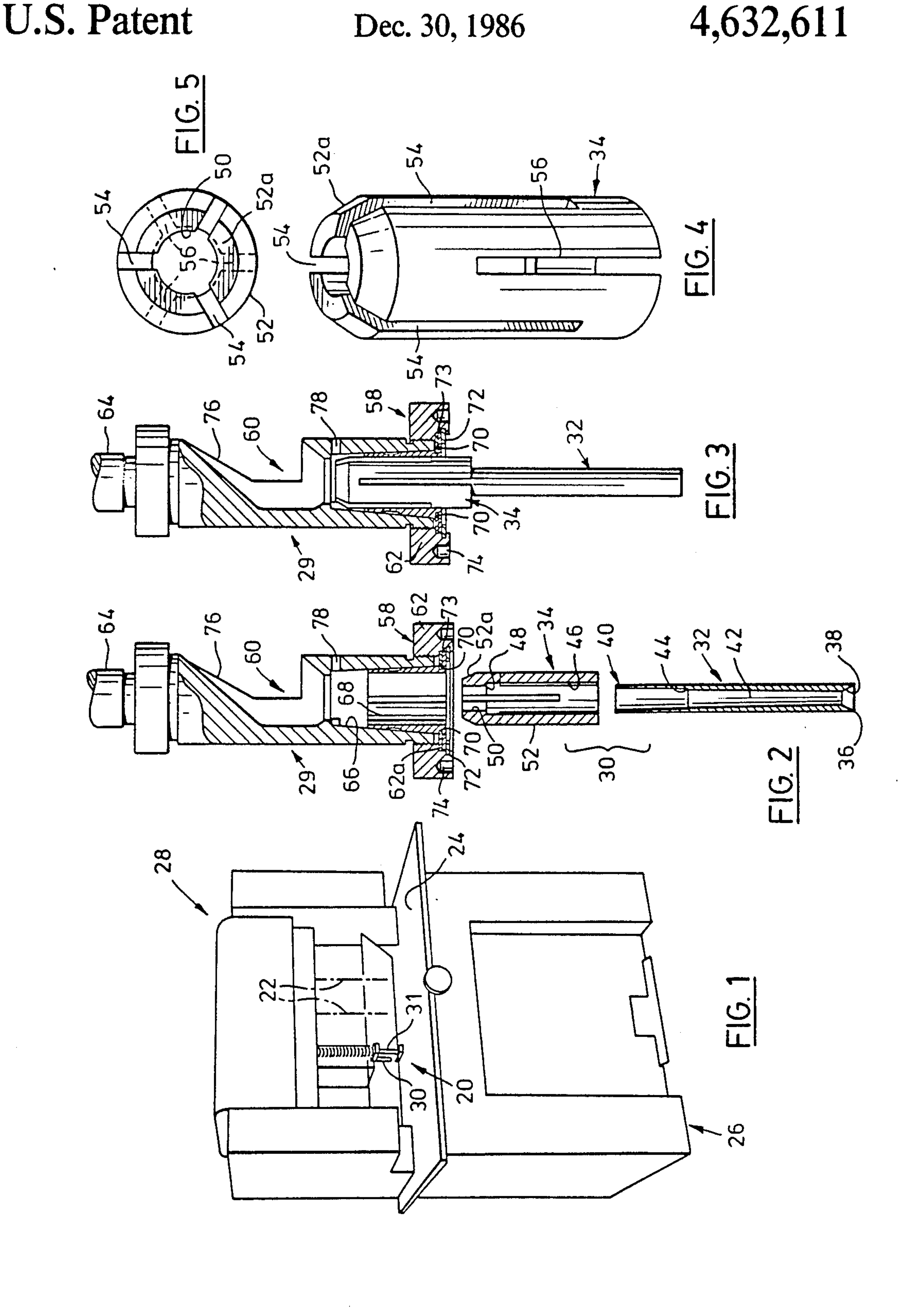
FIG. 1 is a somewhat schematic front perspective view of a paper drilling machine.
FIG. 2 is an exploded front elevational view, partly in vertical section, of one of the drill head spindles of the machine shown in FIG. 1, together with a paper drill of the form provided by the invention.
FIG. 3 is a view similar to FIG. 2 but showing the drill in place in the spindle.
FIG. 4 is a front prospective view of the sleeve of the drill.
FIG. 5 is a plan view corresponding to FIG. 4.

Referring first to FIG. 1, a paper drilling machine is shown to include a series (in this case three) of generally of vertical drill heads, one of which is indicated by reference numeral 20 while the positions of the other two are indicated in ghost outline at 22. The heads are positioned above a work table 24 for supporting a stack of paper or the like to be drilled. Work table 24 is carried by a frame 26 at normal working height for an adult operative. A superstructure 28 above the work table supports the drill heads and includes a drive arrangement for simultaneously rotating all of the heads while advancing them towards the work table 24 for drilling the work. The drill heads are rotated simultaneously from a common drive source and are moved together towards and away from the work. Each drill head includes a drill spindle which carries the actual drill. One of these drill spindles is shown in FIGS. 2 and 3 and is generally denoted by reference numeral 29, while the drill is denoted 30. Drill 30 is also partially visible in FIG. 1 behind a work presser foot 31 of drill head 20.

The machine itself has been shown in outline form only since the machine is entirely conventional. By way of example, the machine may be a Lawson Super Duty Drill available from Dexter-Lawson Products Limited of Cambridge, Ontario, Canada.

Referring now particularly to FIGS. 2 and 3, drill 30 is shown to comprise two separate parts, namely a cutting bit 32 and a sleeve 34. The bit and sleeve are shown assembled together and fitted into the drill spindle 29 in FIG. 3, while in FIG. 2 these components are shown in exploded positions.

In this particular embodiment, bit 32 is made of high grade tool steel and is heat treated for hardness, while sleeve 34 is made of mild steel. Bit 32 is of hollow generally cylindrical form and has an annular cutting edge 36 at its lower end as drawn. It will be noted that the edge is formed in the cylindrical external surface of the bit by an internal chamfer 38 in the lower end of the bit. The external diameter of the bit 32 is slightly larger at its cutting edge 36 than at the opposite end of the bit (generally denoted 40) and the external surface of the bit is smoothly tapered between the two ends. These features ensure a clean cutting action as the drill is progressively advanced through a stack of paper. The diameters of the respective ends of the bit may differ by, say, one ten thousandths of an inch.

Internally, bit 32 defines a passageway 42 which extends right through the bit and which is also slightly tapered from a minimum diameter adjacent the cutting edge 36 to a maximum diameter at a shoulder 44. Above the shoulder, the passageway is of uniform diameter.

The difference in the respective diameters of passageway 42 adjacent cutting edge 36 and at shoulder 44 may be of the order of seventeen ten thousandths of an inch. It is of course to be understood that these dimensions are given merely by way of illustration and are not to be taken as limiting. The particular dimensions quoted apply to a drill designed to form holes of three sixteenths of an inch diameter.

Sleeve 34 is also of hollow generally cylindrical form and has an internal cavity 46 shaped to closely receive the end portion of bit 32 remote from cutting edge 36. In practice, the internal diameter of sleeve 34 will be greater than the external diameter of the relevant end portion of bit 32 only by an amount sufficient to allow a close sliding fit between the respective parts. At its upper end as drawn, sleeve 34 defines an internal shoulder 48 against which the upper end edge of bit 32 will abut for defining the assembled position of the bit and sleeve. An opening 50 is provided above shoulder 48 to in effect form a continuation of the passageway 42 in bit 32 so that chips of paper and the like can pass upwardly right through the drill and into the drill head for disposal in conventional fashion.

Sleeve 34 has an external generally cylindrical surface 52 shaped to fit closely within the drill spindle as will be described below. Surface 52 includes a chamfer **52*a*** at the upper end of the sleeve.

As indicated previously, sleeve 34 is required to be radially compressible by the drill spindle 29 so as to frictionally grip the bit 32 and permit transmission of drilling torque from the drill spindle to the bit in use.

In the illustrated embodiment, the required radial compressibility is provided by forming appropriately disposed slots through the wall of the sleeve. In this embodiment, two series of slots are provided and extend inwardly from respectively opposite ends of the sleeve over greater than half the length of the sleeve. The slots in the respective series are alternately arranged to provide for the required radial compressibility of the sleeve.

Referring more specifically to FIG. 5, it will be seen that the sleeve is provided with a first series of slots 54 which extend axially of the sleeve from the upper end thereof over approximately three quarters of the length of the sleeve, and which are equiangularly spaced from one another about the axis of the sleeve. A second series of similar slots 56 extend upwardly from the lower end of the sleeve again over approximately three quarters of the length of the sleeve. These slots are also equiangularly disposed with respect to one another and are arranged so that each slot 56 is disposed substantially midway between each adjacent pair of slots 54. This arrangement of slots has been found to provide the required degree of radial compressibility to permit the sleeve 34 to frictionally grip the bit 32 in practice.

Referring back to FIGS. 2 and 3, a collet assembly 58 is disposed at the lower end of drill spindle 29 and serves to secure the drill 30 to the spindle. Spindle 29 in fact includes a generally cylindrical housing 60 which is externally screw-threaded at its lower end and onto which is threaded a nut 62 of the collet assembly. Above housing 60, the spindle includes a drive shaft 64 by which drive is transmitted to the drill from the drive arrangement of the machine. At its lower end, housing 60 defines a cavity 66 which is slightly tapered towards its upper end; the taper is shown exaggerated somewhat in the drawings. Cavity 66 receives an axially split collet 68 carried by nut 62. Collet 68 is turnably located with respect to nut 62 by a pair of arcuate elements (split washer) 70 received in an external groove in collet 68 and located in a recess **62*a* in nut 62 by a circlip 72, with an intervening washer 73**.

As nut 62 is screwed upwardly on the threads at the lower end of housing 60, collet 68 will be forced along the taper inside cavity 66 and will be radially compressed.

Collet 68 in turn receives the sleeve 34 of drill 30 so that it too will be radially compressed as collect 68 is radially compressed.

Bores 74 are provided in nut 62 for receiving a tool for tightening the collet.

Above cavity 66, housing 60 is formed with a chip ejection slot 76 through which chips of paper removed by the drill are disposed of in conventional fashion.

In summary, it will be understood from the foregoing that drill bit 32 can be positively and firmly held to the drill head by the collet assembly 58 so that drilling torque can be transmitted from the drill spindle to the bit when the machine is in operation. At the same time, bit 32 is readily removable and replaceable simply by loosening the collet nut 62. As indicated previously, the bit and/or sleeve 34 can be made as replaceable throwaway unit which can be changed literally in seconds when the cutting edge 36 becomes dull or damaged. Sleeve 34 can remain within the collet assembly 58 while the drill bit is changed, although in practice it may be more convenient to remove both the bit and sleeve. The chamfer 52 at the upper end of sleeve 34 facilitates insertion of the sleeve into the collet assembly from below (it will be appreciated from FIG. 1 that cavity 66 will not normally be readily visible from the front of the machine). At the same time, the chamfer **52*a* provides clearance for a drive transmitting pin which is sometimes provided in the collet in one of two openings, denoted 78, at the top of cavity 66. Of course, chamfer 52** will not provide for rotational locking with any such pin but this is believed to be unnecessary with a drill of the form provided by the invention.

It will of course be understood that the preceding description relates to a particular preferred embodiment of the invention only and that the invention is not limited to the features described above. As indicated previously, the particular dimensions given are by way of example only. Similarly, the particular materials referred to are given by way of illustration. Sleeve 34 could be made of a variety of materials, including aluminum, brass and plastic. A plastic sleeve might well be disposable. Radial compressiblity of sleeve 34 may be provided for other than in the manner described. For example, in some situations, a different arrangement of slots or even a single slot through the sleeve would be appropriate. In another embodiment, the sleeve might be made of a compressible plastic material or be provided with compressible external and/or internal ribs or other projections, in which case slots may well be unnecessary. The configuration of the sleeve can be designed differently to fit drill spindles other than the Dexter-Lawson spindle shown.

Finally, it should of course be understood that, while reference has been made to the drilling of paper, a drill of the form provided by the invention can of course be used for drilling other materials, examples of which are given previously.

I claim:

1. A paper drill for use in a paper drilling machine having at least one spindle for receiving the drill, the spindle having a cylindrical cavity open at an outer end thereof and through which a paper drill can be inserted into the cavity and means for exerting a radially inwardly directed clamping force on the drill to retain the drill in the spindle; wherein the drill comprises:

a cutting bit of hollow generally cylindrical form having an annular cutting edge at a first end thereof, and, a hollow cylindrical sleeve for receiving said bit and being itself adapted to be received in said spindle, said sleeve being separate from said bit and having an internal cylindrical cavity shaped to closely receive a second end portion of said bit opposite said first end, said cavity extending from an opening at an outer end of the sleeve to an internal shoulder against which said second end portion of the bit abuts when the bit and sleeve are fully assembled, the sleeve having an external generally cylindrical surface shaped to fit within a said drill spindle of a paper drilling machine and extending to a flat annular surface surrounding said opening at the outer end of the sleeve, the sleeve being radially inwardly compressible in response to a said radially inwardly directed clamping force exerted by said spindle and being adapted to frictionally grip said bit sufficiently securely to permit transmission of drilling torque from said spindle to said bit in use.

2. A paper drill as claimed in claim 1, wherein said sleeve includes at least one axial slot for providing said radial compressibility.

3. A paper drill as claimed in claim 2, wherein said sleeve includes respective series of axial slots angularly spaced about said sleeve and extending inwardly from respectively opposite ends of the sleeve over a distance greater than half the length of the sleeve but less than the full length, with the slots in each series intervening the slots of the other series, whereby said series of slots provide the required radial compressibility of the sleeve.

4. A paper drill as claimed in claim 3, wherein said sleeve is made of steel.

5. A paper drill as claimed in claim 1, wherein said sleeve defines a shoulder in said internal cylindrical cavity against which a second end of the cutting bit abuts when the bit and sleeve are assembled together.

6. A paper drill as claimed in claim 1, wherein said cutting bit has an external surface which tapers slightly from the maximum diameter adjacent said cutting edge to a minimum diameter at a second end of the bit.

7. A paper drill as claimed in claim 1, wherein said cutting bit defines an internal passageway extending from said cutting edge, said passageway being of a minimum diameter adjacent said edge and increasing in a direction away from said edge.

8. A paper drill as claimed in claim 1, wherein said cutting bit is made of hardened tool steel.

9. In a paper drilling machine having at least one rotary drill head including a drill spindle fitted with a collet assembly having a cylindrical cavity open at an outer end thereof and through which a paper drill can be inserted into the cavity and means for exerting a radially inwardly directed clamping force on said drill to retain it in the cavity, the improvement comprising a paper drill received in said collet assembly and comprising a cutting bit of hollow generally cylindrical form having an annular cutting edge at a first end thereof, and a hollow cylindrical sleeve which is separate from said bit and which has an internal cavity closely receiving a second end portion of said bit opposite said first end, said cavity extending from an opening at an outer end of the sleeve to an internal shoulder against which said second end portion of the bit abuts when the bit and sleeve are fully assembled, the sleeve having an external generally cylindrical surface received in said cavity of the collet assembly and extending to a flat annular surface surrounding said opening at the outer end of the sleeve, the sleeve being radially compressed under the effect of said radially inwardly directed clamping force exerted by said collet assembly and frictionally gripping said bit sufficiently securely for permitting transmission of drilling torque from said drill head to said bit in use.

* * * * *